March 19, 1963   J. K. NEWELL, JR., ETAL   3,081,763
COOLING SYSTEM FOR HEATING APPLIANCE
Filed Oct. 9, 1961
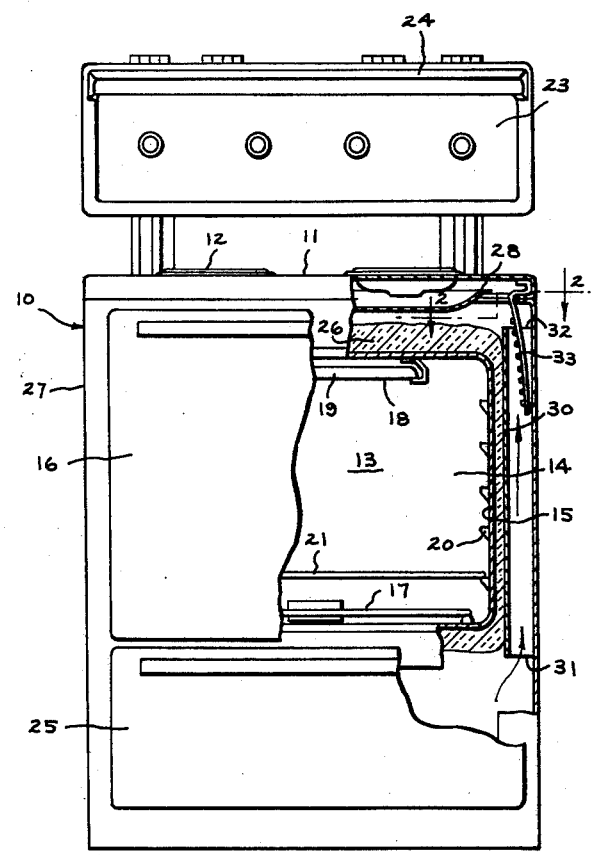
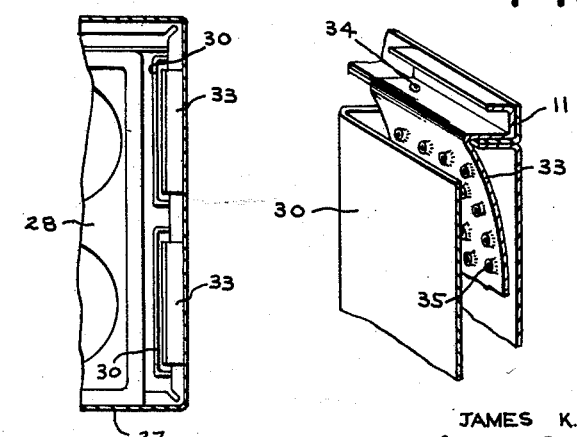
INVENTORS
JAMES K. NEWELL JR.
& DAVID D. AKERS
BY Richard L. Caslin
THEIR ATTORNEY 3,081,763
COOLING SYSTEM FOR HEATING APPLIANCE
James K. Newell, Jr., Louisville, Ky., and David D. Akers, Mountain View, Calif., assignors to General Electric Company, a corporation of New York
Filed Oct. 9, 1961, Ser. No. 143,696
3 Claims. (Cl. 126—21)

The present invention relates to a method of cooling a heating appliance so as to eliminate hot spots that might represent a fire hazard and cause the appliance to fail the safe temperature tests conducted by the Underwriters' Laboratories, Inc.

Heating appliances such as domestic ovens and ranges are tested to insure that the vertical sides of the appliance do not exceed a temperature of 194° F. when all the heating units of the appliance are energized simultaneously, in other words, during the most extreme condition of heat generation.

In recent times a new type of high temperature oven has been developed where the food soil that is deposited on the walls of the oven liner is removed automatically by a heat cleaning processs when the temperature within the oven cavity is raised to a degree between 750° F. and 950° F. for a sufficient length of time to burn off the food soil. When this type of high temperature oven is used simultaneously with the surface heating units and especially with a large grill that straddles a pair of surface heating units along one side of the range, the temperatures along the edge of the cooktop have become excessive. Some means is required for dissipating heat in this area.

The principal object of the present invention is to provide a heating appliance with a heat sink of novel construction for eliminating hot spots in the appliance.

A further object of the present invention is to provide a domestic oven with a cooling system along the side walls thereof so that the excess heat of the oven may be rapidly transferred to a convection air stream before the temperature rises to a point where it might create a fire hazard.

A still further object of the present invention is to provide a novel heat sink for a domestic range for cooperation with vertical air channels along the side walls of the range.

The present invention, is accordance with one form thereof, embodies an oven having an oven cavity formed by a box-like oven liner and a front-opening door. As in standard oven constructions, insulation surrounds the oven liner and an outer cabinet structure covers the insulation. A plurality of vertical air channels are formed on the opposite sides of the oven between the insulation and the cabinet. Ambient air moves upwardly through these channels for cooling the side walls of the cabinet. In addition, a heat sink is disposed in the top of certain of the channels for absorbing heat from the top portion of the oven and transferring the heat to the convection air stream moving upwardly in the channels. The heat sink is designed to create a turbulent air flow to speed up the transfer of heat from the heat sink to the air for dissipating the heat externally of the oven.

Our invention will be better understood from the following description taken in connection with the accompanying drawing and its scope will be pointed out in the appended claims.

FIGURE 1 is a front elevational view of a free-standing domestic range embodying the present invention with portions broken away and in cross-section to show the location of the heat sink and the direction of air flow along the side walls;

FIGURE 2 is a fragmentary plan view of the right side wall of the oven taken on the line 2—2 of FIGURE 1; and FIGURE 3 is a fragmentary perspective view of the upper portion of one of the air channels showing the heat sink fastened therein.

Turning now to a consideration of the drawing and in particular to FIGURE 1, there is shown one embodiment of this invention incorporated in a free-standing electric range 10 having a top cooking surface 11 that includes a plurality of surface heating elements 12. Located under the cooktop surface 11 is an oven cavity 14 that is formed by a box-like oven liner 15 and a front-opening drop door 16. The oven 13 is shown with a pair of vertically spaced oven units 17 and 18. The lower oven unit 17 is a looped bake unit formed of a metal sheathed resistance element that is plugged into an electrical connector in the back wall of the oven liner 15. The upper heating element 18 is a similar looped resistance element that is used for broiling operations and it incorporates a reflector pan 19 which overlies the broil unit for directing the radiant energy toward the food to be cooked within the oven. This broil unit 18 is likewise connected to a suitable electrical connector in the back wall of the oven liner. Embossments 20 are vertically arranged along the opposite side walls of the oven liner to serve as support means for the several wire racks, such as rack 21, that are adapted to support the food at different elevations within the oven, depending upon the type of food being cooked. The controls for the several heating units of the range are located in a control panel 23 that is mounted in the backsplasher 24 of the range along the back edge of the cooking surface 11. Located below the oven 13 is a pull-out drawer 25 for the storage of pots and pans and other cooking utensils.

Insulation 26 must be placed around the oven liner to retain as much of the heat as possible within the oven cavity so that less heat is wasted into the room and less time is needed for bringing the oven up to the proper cooking or heat cleaning temperature. A typical insulation is a fiber glass insulation that is formed in batts and is placed against the outer surface of the walls of an oven liner. The range includes an outer cabinet structure or range body 27 for serving as the supporting structure for the various components of the range and having an outer porcelain finish to present a pleasing and long wearing appearance. The cabinet structure 27 includes the top cooking surface 11 and an underlying insulation guard plate 28 which extends completely under the surface units 12 to catch and retain any food or liquid that might drop through the center openings of the surface units 12 and thereby protect the insulation 26 from being damaged.

Vertical air channels are established along the side walls of the oven cavity for directing ambient air from under the bottom of the range up along the side walls and out through the center openings of the surface heating units 12. These channels are formed by a plurality of channel-shaped structural members 30 that are fastened to the inner surface of the side walls of the cabinet 27 and are located between the insulation 26 and the said side walls. These channel members 30 are open at both ends. The lower end 31 is positioned below the insulation 26 that underlies the oven liner while the upper end 32 is located adjacent the underside of the cooktop 11. This cooling system does a reasonable job of holding down the temperature of the side walls of the cabinet 27, but the highest temperatures seem to develop along the side edges of the cooktop 11. This difficulty has been remedied by incorporating a perforated plate 33 or heat sink in the top portion of certain of the channel members 30 and fastening the heat sink to the trouble area, namely, the side edge of the cooktop 11 as, for instance, by use of fastening means 34 shown in FIGURE 3. The purpose of the heat sink is to conduct heat away from the hot edge of the cooktop and down into an air channel where the heat is dissipated into the air stream. The preferred embodiment of the heat sink of the present invention is represented by an aluminum sheet which has high thermal conductivity and which increases with increasing temperature rather than decreasing as is the case with most metals. Another preference is that the aluminum plate be blackened so that it absorbs more heat and consequently radiates more heat. It has been found that the speed of transfer of the heat from the heat sink to the air in the vertical channel may be increased by creating a turbulent flow of the air in the vicinity of the heat sink. This turbulence has been created by using a roughened surface such as by perforating the plate which is shown in the example of FIGURE 3 as represented by extruded holes 35. It should be understood that other means may be used for roughening the surface such as by lancing tabs, by embossing or corrugating the plate and using similar techniques. Notice that the roughened heat sink is angularly disposed in the channel member 30 so that the air tends to scrub the plate and pick up heat by convection and radiation and be discharged out of the center openings under the surface heating elements and into the room.

Having described above our invention of a novel cooling system for a heating appliance and particularly of a heat sink for eliminating hot spots that might develop in a domestic range, it will readily be apparent to those skilled in this art that the design is both reasonable in cost as well as completely reliable in operation. The air flow has been shown as created by the normal convection currents that exist along the heated side walls of the oven, but it should be understood that a small fan or blower might be incorporated beneath the oven for increasing the velocity of the air and causing it to cover a greater area of the cabinet structure. We have illustrated this invention with a heat sink 33 located in each air channel 30, but it is reasonable to expect that certain of these could be eliminated if the need did not exist for this type of cooling arrangement along certain portions of the edge of the cooktop 11. This would depend upon the wattage rating of the nearest surface heating units 12 and other factors which might contribute to a critical high temperature being developed at certain locations along the edge of the cooktop.

Modifications of this invention will occur to those skilled in this art and it is to be understood therefore, that this invention is not limited to the particular embodiments disclosed but that it is intended to cover all modifications which are within the true spirit and scope of this invention as claimed.

What we claim as new and desire to secure by Letters Patent of the United States is:

1. An oven having an oven cavity formed by a box-like oven liner and an oven door, insulation surrounding the oven liner, and an outer cabinet structure covering the insulation, a plurality of vertical air channels formed on the opposite sides of the oven between the insulation and the cabinet, certain of the vertical air channels including a portion of a blackened, rough surfaced heat sink that is fastened firmly to a top portion of the outer cabinet structure in an area removed from the air channel for absorbing heat from the cabinet structure and conducting the heat into the air channel, ambient air flowing upwardly through the channels and being converted to turbulent flow by the heat sink for cooling the heat sink and dissipating some of the heat of the top portion of the outer cabinet externally of the oven.

2. A domestic range having an oven with an oven cavity formed by a box-like oven liner and an oven door, insulation surrounding the oven liner, and an outer cabinet structure covering the oven insulation and supporting a plurality of surface heating units, a plurality of vertical air channels formed on the opposite sides of the oven between the insulation and the cabinet, a heat absorbing and reflecting plate being firmly fastened to the underside of the top surface of the cabinet and extending into the top portion of certain of said channels for drawing heat away from the top surface and into the air channel, ambient air flowing upwardly through the channels for cooling the plate and transferring the heat to the air stream and thence externally of the range.

3. A domestic range as recited in claim 2 wherein the vertical air channels are defined by channel-shaped members that are fastened to the inner surface of the side walls of the cabinet, said heat absorbing and reflecting plates being perforated and angularly arranged in the top of the channels across the stream of air therein to cause turbulence and increase the speed of transferring the heat from the plates so that the heat may be carried by the air and dissipated externally of the range.

References Cited in the file of this patent

UNITED STATES PATENTS

| | | |
|---|---|---|
| 2,256,991 | Sabins | Sept. 23, 1941 |
| 2,525,614 | Nelson et al. | Oct. 10, 1950 |
| 2,818,237 | Lehr et al. | Dec. 31, 1957 |
| 2,949,283 | Smith | Aug. 16, 1960 |